United States Patent
Cheng et al.

(10) Patent No.: US 10,237,191 B2
(45) Date of Patent: Mar. 19, 2019

(54) TRAFFIC CLASS ARBITRATION BASED ON PRIORITY AND BANDWIDTH ALLOCATION

(71) Applicants: Albert S. Cheng, Bellevue, WA (US); Thomas D. Lovett, Portland, OR (US); Michael A. Parker, Santa Clara, CA (US)

(72) Inventors: Albert S. Cheng, Bellevue, WA (US); Thomas D. Lovett, Portland, OR (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 15/120,038

(22) PCT Filed: Feb. 18, 2015

(86) PCT No.: PCT/US2015/016442
§ 371 (c)(1),
(2) Date: Aug. 18, 2016

(87) PCT Pub. No.: WO2016/133508
PCT Pub. Date: Aug. 25, 2016

(65) Prior Publication Data
US 2016/0373362 A1 Dec. 22, 2016

(51) Int. Cl.
*H04L 12/02* (2006.01)
*H04L 12/851* (2013.01)
(Continued)

(52) U.S. Cl.
CPC .......... *H04L 47/24* (2013.01); *H04L 43/0894* (2013.01); *H04L 45/64* (2013.01);
(Continued)

(58) Field of Classification Search
CPC ....... H04L 49/358; H04L 47/10; H04L 49/25; H04L 49/70; H04L 47/2433; H04L 47/245
See application file for complete search history.

(56) References Cited

U.S. PATENT DOCUMENTS 7,010,607 B1   3/2006   Bunton
7,076,569 B1   7/2006   Bailey et al.
(Continued)

FOREIGN PATENT DOCUMENTS

WO   2003-005227 A1   1/2003
WO   2013-113567 A1   8/2013

OTHER PUBLICATIONS

Japanese Office Action issued in Japanese Application No. 2016-552987, dated Oct. 17, 2017, with English translation, 7 pages.
(Continued)

*Primary Examiner* — Charles C Jiang
*Assistant Examiner* — Will W Lin
(74) *Attorney, Agent, or Firm* — Grossman, Tucker, Perreault & Pfleger, PLLC

(57) ABSTRACT

This disclosure describes systems, devices, methods and computer readable media for enhanced network communication for use in higher performance applications including storage, high performance computing (HPC) and Ethernet-based fabric interconnects. In some embodiments, a network controller may include a transmitter circuit configured to transmit packets on a plurality of virtual lanes (VLs), the VLs associated with a defined VL priority and an allocated share of network bandwidth. The network controller may also include a bandwidth monitor module configured to measure bandwidth consumed by the packets and an arbiter module configured to adjust the VL priority based on a comparison of the measured bandwidth to the allocated share of network bandwidth. The transmitter circuit may be (Continued)

further configured to transmit the packets based on the adjusted VL priority.

22 Claims, 6 Drawing Sheets

(51) Int. Cl.
    *H04L 12/26*     (2006.01)
    *H04L 12/715*     (2013.01)
    *H04L 12/931*     (2013.01)
    *H04L 12/911*     (2013.01)
    *H04L 12/28*     (2006.01)
    *H04L 12/841*     (2013.01)

(52) U.S. Cl.
    CPC ........ *H04L 47/2433* (2013.01); *H04L 47/822* (2013.01); *H04L 49/358* (2013.01); *H04L 47/245* (2013.01); *H04L 47/283* (2013.01)

(56) References Cited

U.S. PATENT DOCUMENTS

| | | | |
|---|---|---|---|
| 7,436,845 B1* | 10/2008 | Rygh | H04L 49/253 370/351 |
| 2004/0001502 A1 | 1/2004 | Garmire et al. | |
| 2004/0076161 A1 | 4/2004 | Lavian et al. | |
| 2005/0018621 A1* | 1/2005 | Dropps | H04L 49/25 370/254 |
| 2005/0060445 A1* | 3/2005 | Beukema | H04L 47/30 710/52 |
| 2008/0104264 A1 | 5/2008 | Duerk et al. | |
| 2008/0310306 A1* | 12/2008 | Dropps | H04L 49/25 370/235 |
| 2013/0194925 A1* | 8/2013 | DeCusatis | H04L 47/828 370/235 |
| 2013/0332926 A1* | 12/2013 | Jakoljevic | G06F 9/45533 718/1 |
| 2015/0263994 A1* | 9/2015 | Haramaty | H04L 49/90 370/412 |
| 2016/0127236 A1* | 5/2016 | Zahid | H04L 45/04 709/219 |
| 2016/0156538 A1* | 6/2016 | Yalagandula | G06F 9/45533 709/224 |

OTHER PUBLICATIONS

International Search Report and Written Opinion issued in PCT Application No. PCT/US2015/016442, dated Nov. 13, 2015.
Pelissier, J.: "Providing Quality of Service over InfiniBand™ Architecture Fabrics", Intel Corporation, A Symposium on High Performance Interconnects, Aug. 16-18, 2000, See p. 4, left column, line 6—p. 5, right column, line 19, 6 pages.
Extended European Search Report issued in European Application No. 15881424.4, dated Oct. 5, 2017, 11 pages.
European Communication issued in European Application No. 15881424.4, dated Oct. 24, 2017, 1 page.
Japanese Office Action received in Japanese Patent Application No. 2016-552987, dated Jun. 29, 2018, 5 pages.
Chinese Office Action received in Chinese Patent Application No. 2015800009256.1, dated Oct. 31, 2018, 17 pages.
Office Action received in European Patent Application 15 881 424.4 dated Jan. 4, 2019, 6 pages.

* cited by examiner

| VL Group 502 | BW Allocation (%) 504 |
|---|---|
| 0 | 25 |
| 1 | 10 |
| 2 | 15 |
| 3 | 50 |
| 4 | 100 |

FIG. 5

TRAFFIC CLASS ARBITRATION BASED ON PRIORITY AND BANDWIDTH ALLOCATION

FIELD

The present disclosure relates to enhancements for network systems, and more particularly, to traffic class arbitration based on priority and bandwidth allocation.

BACKGROUND

High Performance Computing (HPC) applications often employ HPC fabric network communication technologies such as, for example, Infiniband™. These HPC fabrics may carry different types of traffic including management traffic, storage traffic, application traffic, etc. There may also be different classes of application traffic associated with different levels of Quality of Service (QoS) and different priorities and latency requirements. Existing network fabric switches are generally able to only approximate user configuration requests for priority, share of bandwidth and latency of a user's network traffic.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 5 illustrates a virtual lane group table consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for enhanced network communication for use in higher performance applications including storage, high performance computing (HPC) and Ethernet-based fabric interconnects. A network controller may be configured as part of a network node, for example a switch, to provide arbitration and preemption of packets between multiple traffic classes that may be associated with virtual lanes, as will be described in greater detail below. Arbitration may be performed by adjusting priorities based on a comparison of measured bandwidth (BW) consumption to BW allocation for the virtual lanes. Preemption may be performed based on relative priorities and latency sensitivity of packets transmitted over the virtual lanes. Thus, rules may be provided to configure multiple levels of priority and to specify the amount of bandwidth that may be consumed by higher priority traffic such that lower priority traffic is not starved of bandwidth. Higher-priority traffic, which may generally be of lower bandwidth, may therefore be given priority over other traffic without concern that it could deprive the other traffic of bandwidth if the higher priority traffic were to exceed its allocated bandwidth limits.

Figure 1:
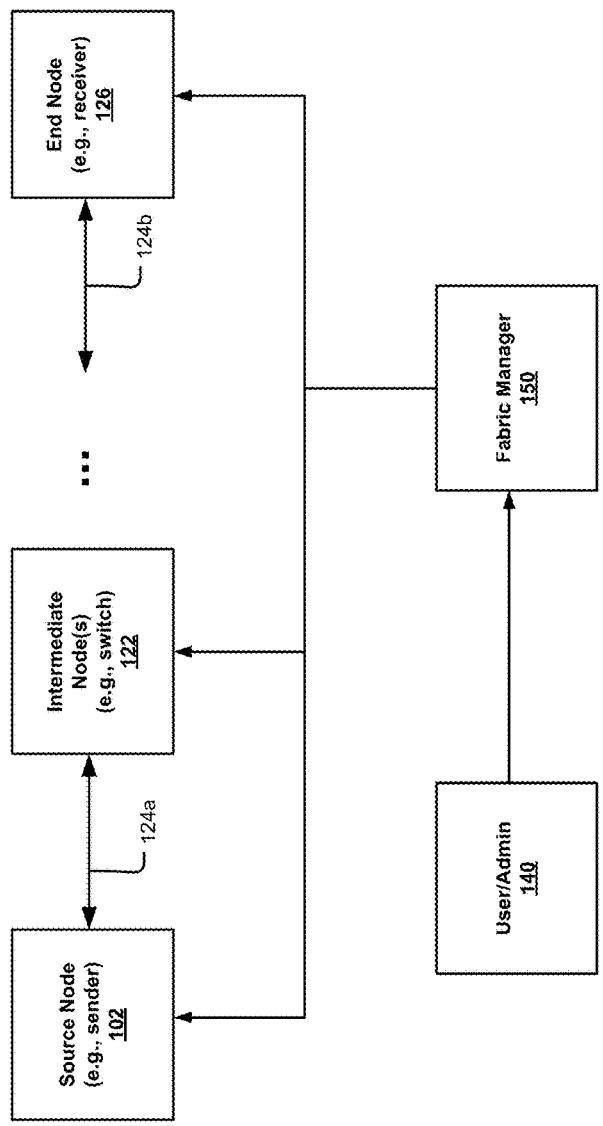
FIG. 1 illustrates a top level diagram of a network system consistent with various embodiments of the present disclosure.

FIG. 1 illustrates a network system 100 consistent with various embodiments of the present disclosure. Network system 100 generally includes at least one network node element 102 (also referred to herein as "source node 102" or a "sender node"), at least one intermediate node element 122 (also referred to herein as a "switch node") and an end node element 126 (also referred to herein as a "receiving node"), each configured to communicate with one another via communications links 124a and 124b, as shown. The source node 102, intermediate node 122 and the end node 126 may be included as link partners in a network fabric, for example an HPC fabric. It is to be understood that the illustration of FIG. 1 is provided for ease of description and that the network fabric may include a plurality of intermediate node elements and/or end node elements, each connected in series and/or parallel with each other and or/with the source node 102, to form for example, a torus network topology, ring topology, Clos topology, fat tree topology, etc. The source node 102, intermediate node 122 and/or end node 126 may each comprise a computer node element (e.g., host server system, laptop, tablet, workstation, etc.), switch, router, bridge, hub, fabric interconnect, network storage device, network attached device, non-volatile memory (NVM) storage device, etc.

It will be appreciated that the terms "source node" and "end node" are used to simplify the description and are not meant to imply a unidirectional transmission flow. Although one side of a full duplex connection may often be referred to herein, the operations are also applicable to the reverse direction (e.g., from end node 126 to source node 102).

A user or network administrator 140 (or other suitable entity) may define any number of traffic classes (TCs) for the network fabric 100, over which different types of traffic may be transmitted, for example in the form of packets. A traffic class may be defined as a quality of service (QoS) level that may be defined apriori between the node elements. More generally, a traffic class may represent a categorization of computer network traffic. For example, certain applications (e.g., voice/video) may require a certain level of packet throughput to operate properly, while other applications like general web browsing and email may not require the throughput of voice and/or video applications. Thus, the traffic classes may be established so that, for example, packet transfers in one traffic class may take priority over transfers from another class. Also, certain traffic, e.g., storage traffic, may be assigned a separate traffic class that may require no packet loss characteristics while other traffic classes may be serviced in a best effort manner. Flow control or congestion management may be enabled in certain traffic classes that require no packet loss behavior, etc.

In some embodiments, the links 124a, 124b may be configured to include any number of virtual lanes (VLs) or groups of virtual lanes (VLGs), which may be associated with different traffic classes (TCs). For example, virtual lane 1 may be configured to carry TCs 1-3 and virtual lane 2 may be configured to carry TCs 4 and 5. In some embodiments, however, a limitation may be imposed such that a VL is associated with only one TC.

Additionally, in some embodiments, multiple VLs may be associated with a TC. So, for example, VLs 0-1 may be associated with TCs 0-4 and VLs 2-3 may be associated with TCs 5-16.

The user/admin 140 may also provide a specification to define the relative priorities between TCs as well as an allocated share of link bandwidth to be provided for each TC. A fabric manager 150 may be configured to map these specifications to the device level (e.g., nodes 102, 122, 126) for use by arbitration and preemption logic, as will be described below. Thus, each VL or VLG may have a defined priority and an allocated share of network or link bandwidth.

The source node 102, the intermediate node 122 and the end node 126 may communicate with each other, via links 124a and 124b, using, for example, an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in March, 2002 and/or later versions of this standard, for example, the IEEE 802.3 Standard for Ethernet, published 2012. The Ethernet protocol may also comply or be compatible with the IEEE standard for Media Access Control (MAC) Bridges and Virtual Bridged Local Area Networks titled "IEEE 802.1Q Standard," published, 2005 or later versions of this standard, for example, the IEEE 802.1Q Standard published, 2011. Of course, in other embodiments, the source node 102, the intermediate node 122 and the end node 126 may communicate with each other using, for example, proprietary and/or custom communication protocols that may or may not resemble the aforementioned Ethernet communications protocol.

Figure 2:
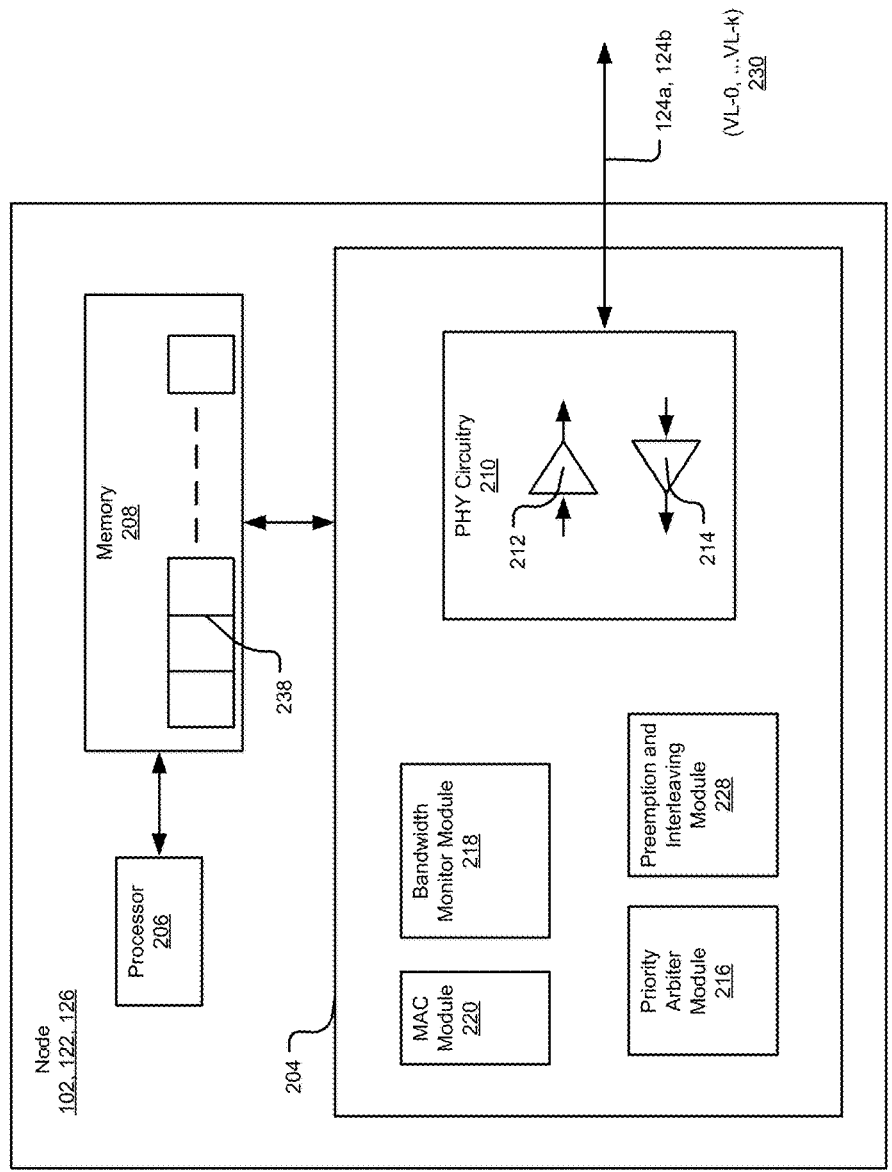
FIG. 2 illustrates a block diagram of a network node consistent with various embodiments of the present disclosure.

FIG. 2 illustrates a block diagram of a network node 200 consistent with various embodiments of the present disclosure. The node 200, which may be representative of node 102, 122, and/or 126 of FIG. 1, may include a network controller 204 (e.g., network interface card, etc.), a system processor 206 (e.g., multi-core general purpose processor, such as those provided by Intel Corp., etc.) and system memory 208. The system memory 208 may include one or more buffers 238, each of which may be established and/or controlled, at least in part, by the network controller 204 and or system processor 206.

The network controller 204 includes PHY circuitry 210 generally configured to interface the nodes via communications links 124a, 124b. PHY circuitry 210 may comply or be compatible with, the aforementioned IEEE 802.3 Ethernet communications protocol, which may include, for example, 10GBASE-T, 10GBASE-KR, 40GBASE-KR4, 40GBASE-CR4, 100GBASE-CR10, 100GBASE-CR4, 100 GB ASE-KR4, and/or 100GBASE-KP4 and/or other PHY circuitry that is compliant with the aforementioned IEEE 802.3 Ethernet communications protocol and/or compliant with any after-developed communications protocol. PHY circuitry 210 includes a transmitter circuit (Tx) 212 configured to transmit data packets and/or frames via links 124a, 124b, and a receiver circuit (Rx) 214 configured to receive data packets and/or frames from via links 124a, 124b. Of course, PHY circuitry 210 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuit 214 may include phase lock loop circuitry (PLL, not shown) configured to coordinate timing of data reception.

The communications link 124a and/or 124b may each comprise, for example, a media dependent interface that may include, for example, copper twin-axial cable, backplane traces on a printed circuit board, fibre optic cable, copper twisted pair cable, etc. In some embodiments, the communications links 124a and 124b each may include a plurality of logical and/or physical channels (e.g., differential pair channels) that provide separate connections between, for example, the Tx and Rx 212/214 of the nodes 102, 122, 126. In the case of the intermediate node 122, (for example, a switch or a router) there may not be an explicit network controller 204 within the intermediate node, however the functional blocks illustrated for the network controller 204 may be included as part of the switch or router logic or silicon. "Link Level," as used herein, means frame communication between, for example, source node 102 and intermediate node 122 through a link 124a. Thus, in this context, the "link" includes frame transmission between node 102 and node 122 over link 124a. For example, TX circuit of node 102 sends frames to RX circuit of node 122 over link 124a.

Network controller 204 also includes a media access control (MAC) module 220 configured to provide addressing and access control protocols for communication with the intermediate node 122 and/or the end node 126, as may be defined by the aforementioned Ethernet communications protocol (e.g., MAC module 220 may be a Layer 2 device).

The network controller 204 may also include a bandwidth monitor module 218 generally configured to measure bandwidth consumed by each of the virtual lanes 230 on links 124a, 124b. The network controller 204 may also include a priority arbiter module 216 generally configured to adjust the priority of a virtual lane based on a comparison of the measured bandwidth to an allocated share of bandwidth for that lane. The network controller 104 may also include preemption and interleaving module 228 generally configured to interrupt transmission of lower priority packets for higher priority packets. Each of the modules 216, 218 and 228 will be described in greater detail below. It should be understood that, in some embodiments, a node may include a subset of the modules illustrated in FIG. 2 and therefore, not all of the illustrated modules are necessary for any embodiment. In some embodiments, the various components, circuits and modules of the network node 102, 122, 126 (including the network controller 204, processor 206 and/or other systems may be combined in a system-on-a-chip (SoC) architecture. The SoC may be included as part of a server system or CPU.

Figure 3:
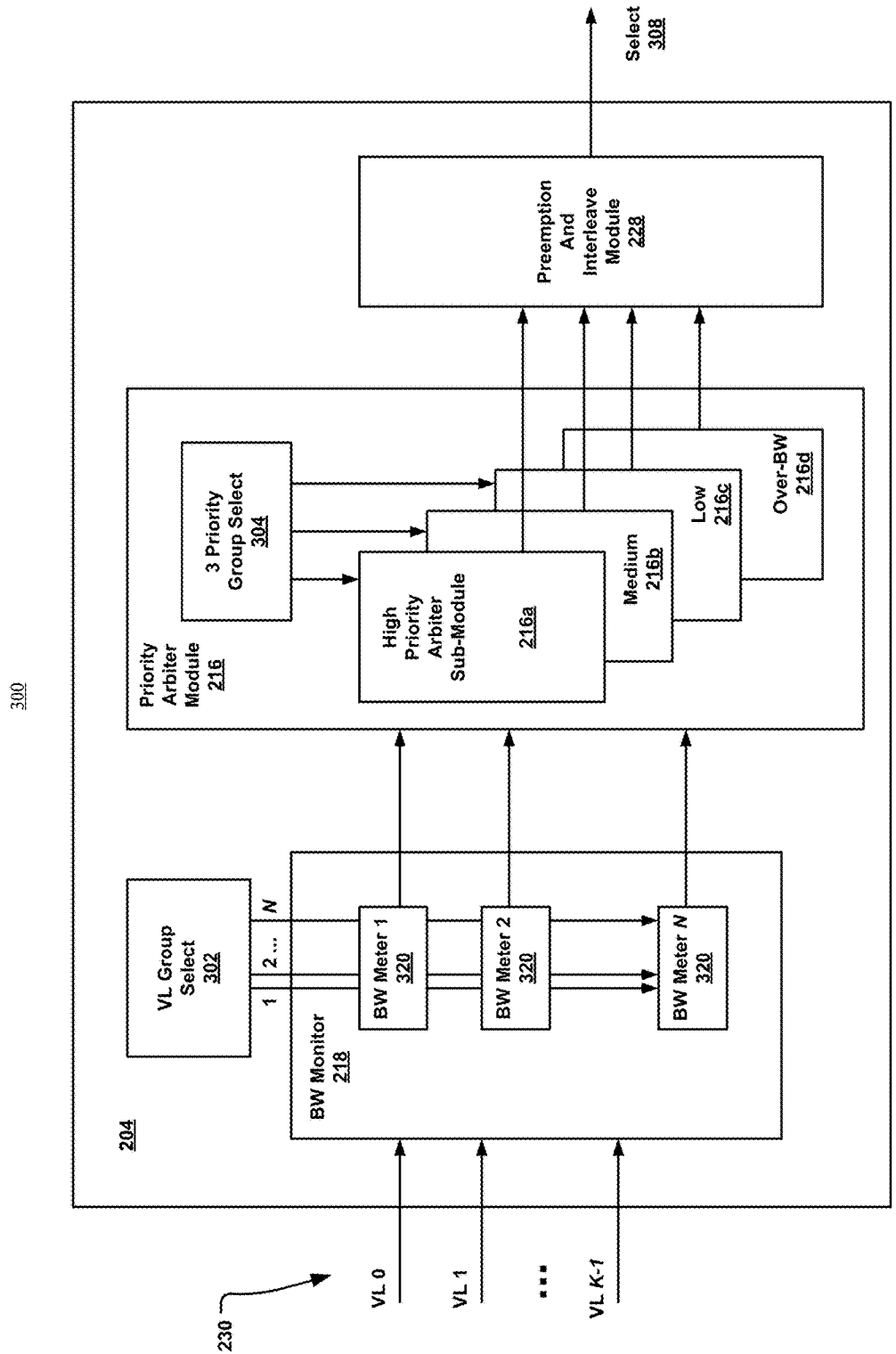
FIG. 3 illustrates a block diagram of a network controller consistent with various embodiments of the present disclosure.

FIG. 3 illustrates a more detailed block diagram 300 of portions of network controller 204 consistent with various embodiments of the present disclosure. A number (K) of virtual lanes 230 (i.e., VL 0 through VL K−1) are provided as input to the network controller 204. Each virtual lane may be associated with a traffic class. Bandwidth monitor module 218 is shown to include a number (N) of bandwidth meters 320, each configured to measure the bandwidth consumed by a selected group of virtual lanes. In some embodiments, up to N groups of virtual lanes may be selected for measurement by VL group select module 302. The groups of virtual lanes (VLGs) may include any of the K virtual lanes that are provided as input. For example a first VLG may include VL 0, VL 2 and VL 3, while a second VLG may include VL 1, VL 5 and VL K−1. Of course, any other groupings and combinations are possible with up to N different groups and up to K different VLs. Thus each of the VLs may be assigned to one of the N bandwidth meters 320 and, in some embodiments, multiple VLs may be assigned to a bandwidth meter. In general, though, a VL may not be assigned to multiple bandwidth meters 302. In some embodiments, the bandwidth meters 302 may be implemented using Token Buckets, Leaky Buckets, Sliding Windows or any other known mechanism configured to measure the bandwidth usage consumed within a period of time.

Priority arbiter module 216 is shown, in this example, to include 4 arbiter sub-modules 216a, 216b, 216c, 216d each configured to arbitrate among one of the 4 priority levels: High-Priority, Medium-Priority, Low-Priority and Over-Bandwidth, respectively. It will be appreciated that in other embodiments any number of arbiter sub-modules and associated priority levels may be used. Priority arbiter module 216 is also shown to include a priority group selection module 304 configured to regulate the way in which link bandwidth is shared by the multiple VLs or VLGs based on the bandwidth monitoring, particularly when one or more VLs or VLGs exceed their allocated bandwidth limits. A VL or VLG that exceeds its allocated bandwidth is termed "non-conforming" in this disclosure, otherwise it is considered to be "conforming." For example, if VL-0 is allocated X bits per second, but the network tries to transmit traffic through at a packet rate that exceeds X bits per second, then VL-0 will be classified as non-conforming. The classification of a VL/VLG as either conforming or non-conforming may change over time based on the results of the bandwidth monitoring.

When traffic is conforming, the bandwidth monitoring may play no role. The arbitration policy for conforming traffic may include the application of pre-assigned priority, for example by module 304, across the priority levels of a given group (VLG) (e.g., High-Priority, Medium-Priority, and Low-Priority). Within a priority level, a round-robin scheme may be employed by each priority arbiter sub-module 216a, 216b, 216c, for choosing a VL assigned to that priority. In some embodiments, any of a number of other known alternatives to the round-robin scheme may be used, such as, for example a least-recently-used scheme. Groups that exceed the bandwidth allocation, however, may be assigned, for example by module 304, to a lowest possible priority level. This lowest level (e.g., Over-BW priority level) is lower than the priority levels assigned to any of the conforming traffic (e.g., 216a, 216b, 216c).

In operation, each VL may be assigned to one of the N bandwidth monitoring groups associated with one of the N bandwidth meters 320. In a first example embodiment, a bandwidth check is performed on each VL by the bandwidth meter to which the VL is assigned. The check is to determine if the VL has exceeded the allocated bandwidth usage. If the usage has not been exceeded (i.e., the VL passes the BW check), then the VL is provided, as a candidate for arbitration, to the priority arbiter sub-module associated with the assigned priority level for that VL (e.g., High-Priority, Medium-Priority, and Low-Priority). If the usage has been exceeded (i.e., the VL fails the BW check), then the VL is assigned to the lowest priority level, e.g., Over-Bandwidth level, and is provided, as a candidate for arbitration, to the Over-BW priority arbiter sub-module 216d. Each of the arbiter sub-modules 216a, 216b, 216c, and 216d perform arbitration among all of their candidates at the priority level associated with that sub-module (e.g., High-Priority, Medium-Priority, Low-Priority and Over-Bandwidth).

In a second example embodiment, each VL is assigned to one of the N bandwidth monitoring groups associated with one of the N bandwidth meters 320, but each bandwidth monitoring group arbitrates among its assigned VLs to produce one candidate VL for that group. The resulting candidate VL for the group is bandwidth checked to determine if the VL has exceeded the allocated bandwidth usage. If the usage has not been exceeded, then the VL is provided, as a candidate for arbitration, to the priority arbiter sub-module associated with the assigned priority level for that VL (e.g., High-Priority, Medium-Priority, and Low-Priority). If the usage has been exceeded, then the VL is assigned to the lowest priority level, e.g., Over-Bandwidth level, and is provided, as a candidate for arbitration, to the Over-BW priority arbiter sub-module 216d.

The following illustration may serve to highlight the differences between the first and second embodiment examples described above. For the purposes of this illustration there are six VLs (VLs 0-5) and two bandwidth monitoring groups (BW0 and BW1). VLs 0-3 are assigned to BW0 and VLs 4-5 are assigned to BW1. Further, to this illustration, all of the VLs are allocated 10% of the available bandwidth and all are exceeding that limit. Thus, in the first example embodiment, all VLs 0-5 will fail their BW checks and proceed to the Over-BW priority arbitration 216d where they will each receive an equal share (⅙) of the available bandwidth. In the second example embodiment, however, BW0 monitoring group will pick a first candidate from among VLs 0-3 and BW1 monitoring group will pick a second candidate from among VLs 4-5. Both candidates will fail their BW checks and proceed to the Over-BW priority arbitration 216d where they will be selected at equal rates (½ each) with the result that each of VLs 0-3 receive ⅛ of the available bandwidth (four VLs share half of the bandwidth), while each of VLs 4-5 receive ¼ of the available bandwidth (two VLs share the other half of the bandwidth).

In some embodiments, if a VL fails the bandwidth check it may be disqualified from transmission (e.g., not made available as a candidate for any arbitration), thus allowing the Over-BW priority arbiter sub-module 216d to be eliminated.

The arbitration performed by each arbiter sub module 216a, 216b, 216c, 216d may be independent of the arbitrations performed by the other sub modules. For example, the Low-Priority arbiter sub-module 216c can make a selection without checking whether there is a High-Priority candidate that would render that selection irrelevant. This independent arbitration process may use any of a number of known arbitration schemes, including round-robin or least-recently-used, which may be chosen by the implementation. The selected VL resulting from the arbitration (e.g., the VL that "wins" arbitration) in each of the priority levels may then go through an additional stage of arbitration based on their priority levels. In this additional stage, the highest priority candidate takes precedence over the lower priority candidates and is selected 308 for transmission.

Preemption and interleaving module 228 may be configured to perform packet preemption and interleaving during another stage of the arbitration process. Packet preemption may be employed to reduce latency for high-priority latency sensitive traffic. Certain types of data and applications may be more sensitive to packet latency than others. For example, an audio stream in a voice-over-IP application may be more sensitive to latency because users engaged in a two-way conversation will typically be distracted or annoyed by latency in the audio transmission. In some embodiments, latency sensitivity may be quantified and associated with a type of traffic. The sensitivity may be expressed, for example in terms of an acceptable time delay or as a relative measure of importance.

Interleaving may be employed to reduce bandwidth wastage on the link when fragmentation occurs in the currently active packet. Fragmentation may occur, for example, when preemption is applied by preemption and interleaving modules of upstream nodes (e.g., other intermediate nodes 122 between the current node and the source node 102). Users or network administrators may specify that certain VLs or VLGs carry latency sensitive traffic. The preemption and interleaving module 228 may be configured to allow packets in these VLGs to preempt packets in other VLGs by interrupting transmission of a lower priority packet to send the higher priority packet. When the higher priority packet has been transmitted, transmission of the preempted packet is resumed. In some embodiments, a packet of any priority may be allowed to interleave into another active packet if that active packet runs out of (e.g., is depleted of) flow control digits (FLITS) to send, where a FLIT is the smallest unit of transmittable information that is subject to flow control.

Thus, rules may be set to configure multiple levels of priority and to specify the amount of bandwidth that may be consumed by higher priority traffic to control bandwidth starvation of lower priority traffic. A rule may specify, for example, that a traffic class which requires relatively low latency along with relatively low bandwidth is configured at the highest priority but with a small bandwidth guarantee, for example 10% of available bandwidth is guaranteed to the class. As long as the nodes generating this traffic conform to this low bandwidth expectation, the traffic class will continue to receive the highest priority. If one or more nodes start sending an abnormal amount of this traffic, either due to programming error or with malicious intent, the traffic class will exceed its bandwidth guarantee and its priority will drop. Higher priority traffic, which is specified as lower bandwidth, may therefore be prioritized over other traffic without concern that it could starve the other traffic of bandwidth if it were to become non-conforming.

In some embodiments, nonconforming packets may not be counted by the bandwidth monitor 218 because they are sent only if there are no other conforming packets to be sent, and thus bandwidth is not taken from other conforming traffic by these packets. Bandwidth checks may be performed at packet boundaries and the check may be repeated as long as the packet fails to win arbitration. A nonconforming packet may become conforming while it is waiting to win arbitration. In this case, the packet switches from the lowest priority back to the priority to which it was originally assigned. If the bandwidth limit has been exceeded part way through the transmission of a packet, the packet may finish being sent as a conforming packet and not yield to another packet that has the same or lower priority in order to reduce packet fragmentation downstream in the link. In some embodiments, however, bandwidth checks may also be performed at FLIT boundaries. In such cases, a packet can change priority to Over-BW part way through the packet and other packets (from a lower priority level) can preempt.

Figure 4:
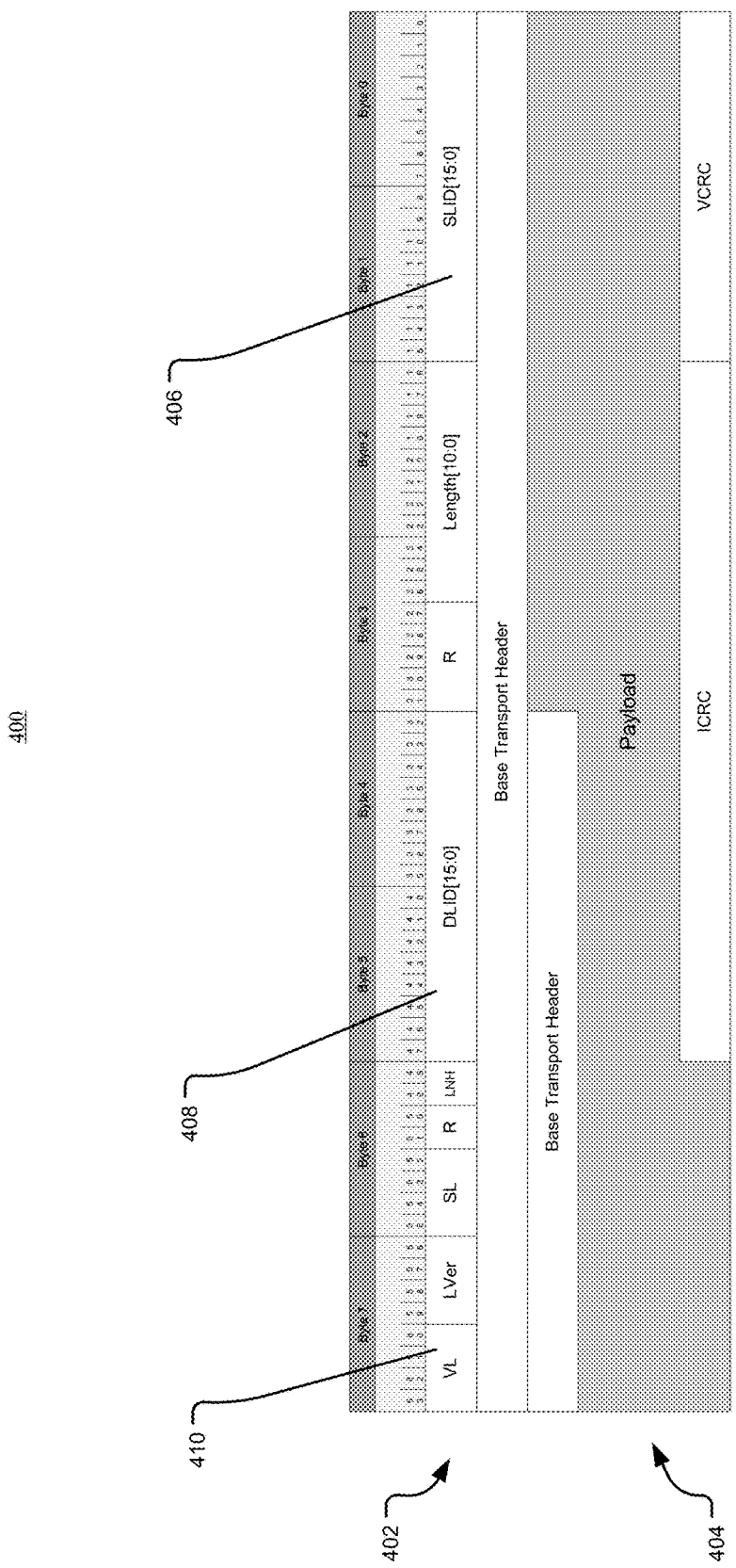
FIG. 4 illustrates a packet frame consistent with various embodiments of the present disclosure.

FIG. 4 illustrates a packet frame consistent with various embodiments of the present disclosure. The frame 400 may be generated by the source node 102 to forward one or more data packets to an intermediate node 122 and/or end node 126. Thus, frame 400 may be viewed as the "sender node" frame format. The frame 400 generally includes a header portion 402, and a payload portion 404. The header portion 402 may be 20 bytes in length, which may be a suitable size to support features of an HPC network fabric. The frame format shown may accommodate a payload of up to 4 KBytes. Source and destination addresses or location IDs (SLID 406, DLID 408) are each 16 bits long to provide a location addressing capability that exceeds 48K location IDs. The Virtual Lane (VL) field 410 may be configured to specify the virtual lane associated with the transmission of this packet. In this illustration, the VL field 410 is 4 bits long which allows for 16 possible lanes.

FIG. 5 illustrates a virtual lane group table 500 consistent with various embodiments of the present disclosure. Groups of VLs 502, may each be assigned a bandwidth limit or allocation, for example by the fabric manager, and bandwidth monitors may be used to check whether each group has exceeded its allocated link bandwidth during each arbitration cycle. Each implementation may decide on the number of groups to be supported. The bandwidth distribution may be assigned based on a percentage of use of the link bandwidth shared among the different groups. Table 500 illustrates an example of how bandwidth allocations 504 may be assigned to five different VL groups 502. This example illustrates that the sum of the bandwidth limits across all groups is allowed to exceed 100% of the link bandwidth. This is allowed because the fabric manager may specify a relatively high limit for management traffic (in this example, VL group 4) with the expectation that it will only rarely consume that much bandwidth. Thus, management traffic is allowed to have the required bandwidth when it is needed. Bandwidth allocation for the remaining traffic (in this example VL groups 0-3) may be assigned on the assumption that management traffic is normally minimal and thus limits may be specified across the other traffic types (VL groups 0-3) which sum to 100%.

Figure 6:
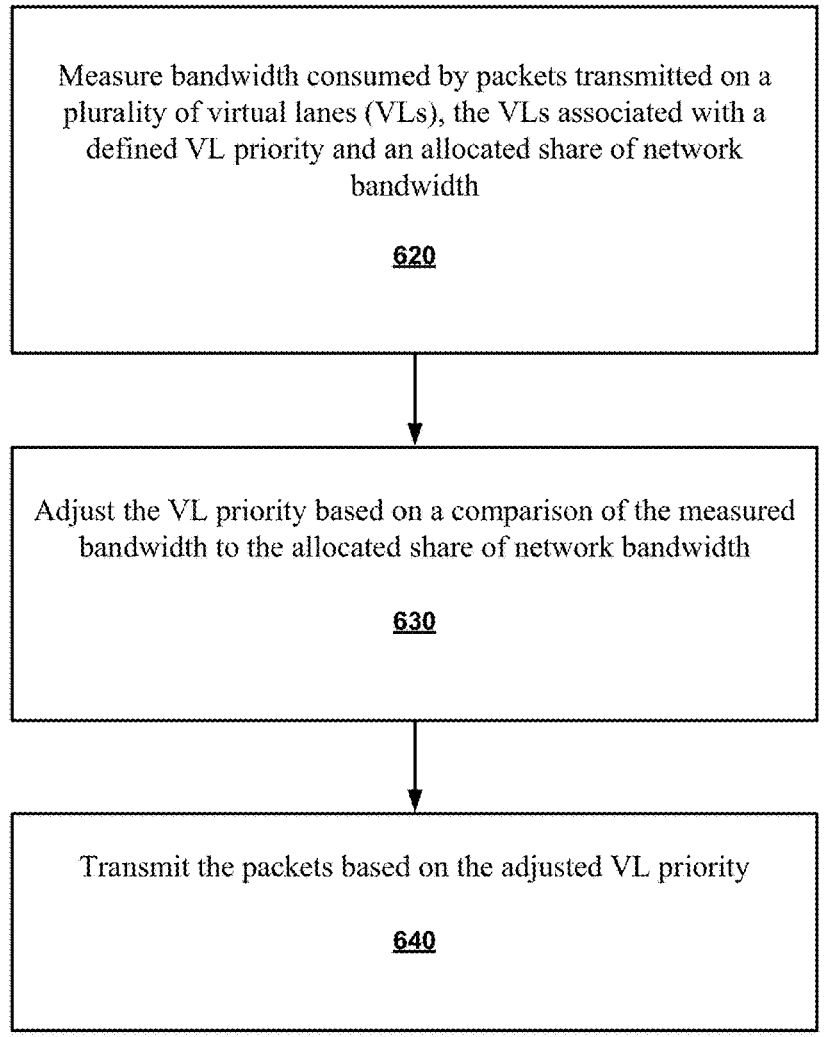
FIG. 6 illustrates a flowchart of operations of one example embodiment consistent with the present disclosure.

FIG. 6 illustrates a flowchart of operations 600 of one example embodiment consistent with the present disclosure. The operations provide a method for providing enhanced network communication. At operation 620, the bandwidth that is consumed by packets transmitted on each of a plurality of virtual lanes is measured. The virtual lanes are associated with a defined VL priority and an allocated share of network bandwidth. At operation 630, the VL priority is adjusted based on a comparison of the measured bandwidth to the allocated share of network bandwidth. The adjustment may include reducing the VL priority to a lowest value selected from a range of priorities (which may be predefined), if the measured bandwidth exceeds the allocated share of network bandwidth. At operation 640, the packets are transmitted based on the adjusted VL priority.

The foregoing includes example system architectures and methodologies. Modifications to the present disclosure are possible. The host processor 206 may include one or more processor cores and may be configured to execute system software. System software may include, for example, operating system code (e.g., OS kernel code) and local area network (LAN) driver code. LAN driver code may be configured to control, at least in part, the operation of the network controller 204. System memory may include I/O memory buffers configured to store one or more data packets that are to be transmitted by, or received by, network controller 204. Chipset circuitry may generally include "North Bridge" circuitry (not shown) to control communication between the processor, network controller 204 and system memory 208.

Node 102 and/or link partner 122 or 126 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/ Internet Protocol) protocol stack comprising one or more programs for handling (e.g., processing or generating) packets to transmit and/or receive over a network. A protocol stack may alternatively be comprised of a dedicated subsystem such as, for example, a TCP offload engine and/or network controller 204. The TCP offload engine circuitry may be configured to provide, for example, packet transport, packet segmentation, packet reassembly, error checking, transmission acknowledgements, transmission retries, etc., without the need for host CPU and/or software involvement.

The system memory 208 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more tangible computer readable storage mediums having stored thereon, individually or in combination, instructions that when executed by one or more processors perform the methods. The processor may include, for example, a processing unit and/or programmable circuitry in the network controller 204, system processor 206 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage device suitable for storing electronic instructions.

"Module," as used herein, may comprise, singly or in any combination circuitry and/or code and/or instructions sets (e.g., software, firmware, etc.). The terms "circuitry" or "circuit" as used in any embodiment herein, may comprise, for example, singly or in any combination, hardwired circuitry, programmable circuitry, state machine circuitry, and/or firmware that stores instructions executed by programmable circuitry. The circuitry may be embodied as an integrated circuit, such as an integrated circuit chip. Thus, the network controller (or network node or network switch) may be embodied as a stand-alone integrated circuit or may be incorporated as one of several components on an integrated circuit, which may also include a processor or CPU. In some embodiments, the various components, circuits and modules of the network controller or other systems may be combined in a system-on-a-chip (SoC) architecture. The SoC may be included as part of a server system or CPU.

Thus, the present disclosure provides systems, devices, methods and computer readable media for enabling enhanced Ethernet network communications. The following examples pertain to further embodiments.

According to Example 1 there is provided a network controller to communicate with one or more other network nodes. The network controller may include a transmitter circuit configured to transmit packets on a plurality of virtual lanes (VLs), the VLs associated with a defined VL priority and an allocated share of network bandwidth; a bandwidth monitor module configured to measure bandwidth consumed by packets transmitted on the plurality of VLs; and an arbiter module configured to adjust the VL priority based on a comparison of the measured bandwidth to the allocated share of network bandwidth, and the transmitter circuit transmits the packets based on the adjusted VL priority.

Example 2 may include the subject matter of Example 1, and the VL priority adjustment includes reducing the VL priority to a lowest value selected from a range of priorities, if the measured bandwidth exceeds the allocated share of network bandwidth.

Example 3 may include the subject matter of Examples 1 and 2, and the VL priority adjustment includes disqualifying the VL from being transmitted, if the measured bandwidth exceeds the allocated share of network bandwidth.

Example 4 may include the subject matter of Examples 1-3, further including a preemption module to interrupt transmission of the packets from a first virtual lane to transmit packets from a second virtual lane, and the second virtual lane is associated with a specified latency sensitivity.

Example 5 may include the subject matter of Examples 1-4, and the priority of the interrupted packets from the first virtual lane is lower than the priority of the transmitted packets from the second virtual lane.

Example 6 may include the subject matter of Examples 1-5, and the preemption module is further to re-start transmission of a remaining fragment of the interrupted packet.

Example 7 may include the subject matter of Examples 1-6, further including an interleaving module to interleave a first of the packets into a second of the packets if the second packet is depleted of flow control digits.

Example 8 may include the subject matter of Examples 1-7, and each of the virtual lanes is associated with a traffic class.

Example 9a may include the subject matter of Examples 1-8, and the controller is employed in a network fabric switch, and the controller is to receive virtual lane configuration information from a fabric manager of the network fabric, the virtual lane configuration information including: the defined VL priority; the allocated share of network bandwidth; and the latency sensitivity.

Example 9b may include the subject matter of Examples 1-8, and the network controller is employed in a network node that further includes a processor, and the network node is incorporated in a system-on-a-chip (SoC).

According to Example 10 there is provided a method for enhanced network communication. The method may include measuring bandwidth consumed by packets transmitted on a plurality of virtual lanes (VLs), the VLs associated with a defined VL priority and an allocated share of network bandwidth; adjusting the VL priority based on a comparison of the measured bandwidth to the allocated share of network bandwidth; and transmitting the packets based on the adjusted VL priority.

Example 11 may include the subject matter of Example 10, and the adjusting further includes reducing the VL priority to a lowest value selected from a range of priorities, if the measured bandwidth exceeds the allocated share of network bandwidth.

Example 12 may include the subject matter of Examples 10 and 11, and the adjusting further includes disqualifying the VL from being transmitted, if the measured bandwidth exceeds the allocated share of network bandwidth.

Example 13 may include the subject matter of Examples 10-12, further including interrupting transmission of the packets from a first virtual lane to transmit packets from a second virtual lane, and the second virtual lane is associated with a specified latency sensitivity.

Example 14 may include the subject matter of Examples 10-13, and the priority of the interrupted packets from the first virtual lane is lower than the priority of the transmitted packets from the second virtual lane.

Example 15 may include the subject matter of Examples 10-14, further including re-starting transmission of a remaining fragment of the interrupted packet.

Example 16 may include the subject matter of Examples 10-15, further including interleaving a first of the packets into a second of the packets if the second packet is depleted of flow control digits.

Example 17 may include the subject matter of Examples 10-16, further including associating each of the virtual lanes with a traffic class.

Example 18 may include the subject matter of Examples 10-17, further including receiving virtual lane configuration information from a network fabric manager of the network, the virtual lane configuration information including: the defined VL priority; the allocated share of network bandwidth; and the latency sensitivity.

According to Example 19 there is provided at least one computer-readable storage medium having instructions stored thereon which when executed by a processor result in the following operations for enhanced network communication. The operations may include measuring bandwidth consumed by packets transmitted on a plurality of virtual lanes (VLs), the VLs associated with a defined VL priority and an allocated share of network bandwidth; adjusting the VL priority based on a comparison of the measured bandwidth to the allocated share of network bandwidth; and transmitting the packets based on the adjusted VL priority.

Example 20 may include the subject matter of Example 19, and the adjusting further includes reducing the VL priority to a lowest value selected from a range of priorities, if the measured bandwidth exceeds the allocated share of network bandwidth.

Example 21 may include the subject matter of Examples 19 and 20, and the adjusting further includes disqualifying the VL from being transmitted, if the measured bandwidth exceeds the allocated share of network bandwidth.

Example 22 may include the subject matter of Examples 19-21, further including interrupting transmission of the packets from a first virtual lane to transmit packets from a second virtual lane, and the second virtual lane is associated with a specified latency sensitivity.

Example 23 may include the subject matter of Examples 19-22, and the priority of the interrupted packets from the first virtual lane is lower than the priority of the transmitted packets from the second virtual lane.

Example 24 may include the subject matter of Examples 19-23, further including re-starting transmission of a remaining fragment of the interrupted packet.

Example 25 may include the subject matter of Examples 19-24, further including interleaving a first of the packets into a second of the packets if the second packet is depleted of flow control digits.

Example 26 may include the subject matter of Examples 19-25, further including associating each of the virtual lanes with a traffic class.

Example 27 may include the subject matter of Examples 19-26, further including receiving virtual lane configuration information from a network fabric manager of the network, the virtual lane configuration information including: the defined VL priority; the allocated share of network bandwidth; and the latency sensitivity.

According to Example 28 there is provided a system for enhanced network communication. The system may include means for measuring bandwidth consumed by packets transmitted on a plurality of virtual lanes (VLs), the VLs associated with a defined VL priority and an allocated share of network bandwidth; means for adjusting the VL priority based on a comparison of the measured bandwidth to the allocated share of network bandwidth; and means for transmitting the packets based on the adjusted VL priority.

Example 29 may include the subject matter of Example 28, and the means for adjusting further includes means for reducing the VL priority to a lowest value selected from a range of priorities, if the measured bandwidth exceeds the allocated share of network bandwidth.

Example 30 may include the subject matter of Examples 28 and 29, and the means for adjusting further includes means for disqualifying the VL from being transmitted, if the measured bandwidth exceeds the allocated share of network bandwidth.

Example 31 may include the subject matter of Examples 28-30, further including means for interrupting transmission of the packets from a first virtual lane to transmit packets from a second virtual lane, and the second virtual lane is associated with a specified latency sensitivity.

Example 32 may include the subject matter of Examples 28-31, and the priority of the interrupted packets from the first virtual lane is lower than the priority of the transmitted packets from the second virtual lane.

Example 33 may include the subject matter of Examples 28-32, further including means for re-starting transmission of a remaining fragment of the interrupted packet.

Example 34 may include the subject matter of Examples 28-33, further including means for interleaving a first of the packets into a second of the packets if the second packet is depleted of flow control digits.

Example 35 may include the subject matter of Examples 28-34, further including means for associating each of the virtual lanes with a traffic class.

Example 36 may include the subject matter of Examples 28-35, further including means for receiving virtual lane configuration information from a network fabric manager of the network, the virtual lane configuration information including: the defined VL priority; the allocated share of network bandwidth; and the latency sensitivity.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. A network controller to communicate with one or more other network nodes, said network controller comprising:

a transmitter circuit to transmit packets on a plurality of virtual lanes (VLs), said VLs associated with a defined VL priority and an allocated share of network bandwidth;

bandwidth monitor circuitry to measure bandwidth consumed by packets transmitted on said plurality of VLs;

arbiter circuitry to perform a comparison of said measured bandwidth to said allocated share of network bandwidth, to adjust said VL priority responsive to said comparison indicating that said measured bandwidth exceeds said allocated share of network bandwidth, and to transmit said packets based on said adjusted VL priority; and interleaving circuitry to interleave a first packet of said packets into a second packet of said packets if said second packet is depleted of flow control digits.

2. The network controller of claim 1, wherein said VL priority adjustment comprises reducing said VL priority to a lowest value selected from a range of priority values.

3. The network controller of claim 1, wherein said VL priority adjustment comprises disqualifying said VL from being transmitted.

4. The network controller of claim 1, wherein each of said virtual lanes is associated with a traffic class.

5. A network controller to communicate with one or more other network nodes, said network controller comprising:

a transmitter circuit to transmit packets on a plurality of virtual lanes (VLs), said VLs associated with a defined VL priority and an allocated share of network bandwidth;

bandwidth monitor circuitry to measure bandwidth consumed by packets transmitted on said plurality of VLs;

arbiter circuitry to perform a comparison of said measured bandwidth to said allocated share of network bandwidth, to adjust said VL priority responsive to said comparison indicating that said measured bandwidth exceeds said allocated share of network bandwidth, and to transmit said packets based on said adjusted VL priority; and preemption circuitry to interrupt transmission of said packets from a first virtual lane to transmit packets from a second virtual lane, wherein said second virtual lane is associated with a specified latency sensitivity.

6. The network controller of claim 5, wherein said priority of said interrupted packets from said first virtual lane is lower than said priority of said transmitted packets from said second virtual lane.

7. The network controller of claim 5, wherein said preemption circuitry is further to re-start transmission of a remaining fragment of said interrupted packet.

8. The network controller of claim 5, wherein said controller is employed in a network fabric switch, and said controller is to receive virtual lane configuration information from a fabric manager of said network fabric, said virtual lane configuration information comprising: said defined VL priority; said allocated share of network bandwidth; and said latency sensitivity.

9. A method for enhanced network communication, said method comprising:

measuring bandwidth consumed by packets transmitted on a plurality of virtual lanes (VLs), said VLs associated with a defined VL priority and an allocated share of network bandwidth;

performing a comparison of said measured bandwidth to said allocated share of network bandwidth, and adjusting said VL priority responsive to said comparison indicating that said measured bandwidth exceeds said allocated share of network bandwidth;

transmitting said packets based on said adjusted VL priority; and interleaving a first packet of said packets into a second packet of a second packet of said packets if said second packet is depleted of flow control digits.

10. The method of claim 9, wherein said adjusting comprises reducing said VL priority to a lowest value selected from a range of priority values.

11. The method of claim 9, wherein said adjusting comprises disqualifying said VL from being transmitted.

12. A method for enhanced network communication, said method comprising:

measuring bandwidth consumed by packets transmitted on a plurality of virtual lanes (VLs), said VLs associated with a defined VL priority and an allocated share of network bandwidth;

performing a comparison of said measured bandwidth to said allocated share of network bandwidth, and adjusting said VL priority responsive to said comparison indicating that said measured bandwidth exceeds said allocated share of network bandwidth;

transmitting said packets based on said adjusted VL priority; and interrupting transmission of said packets from a first virtual lane to transmit packets from a second virtual lane, wherein said second virtual lane is associated with a specified latency sensitivity.

13. The method of claim 12, wherein said priority of said interrupted packets from said first virtual lane is lower than said priority of said transmitted packets from said second virtual lane.

14. The method of claim 12, further comprising re-starting transmission of a remaining fragment of said interrupted packet.

15. The method of claim 12, further comprising receiving virtual lane configuration information from a network fabric manager of said network, said virtual lane configuration information comprising: said defined VL priority; said allocated share of network bandwidth; and said latency sensitivity.

16. At least one non-transitory computer-readable storage medium having instructions stored thereon which when executed by a processor result in operations for enhanced network communication, the operations comprising:

measuring bandwidth consumed by packets transmitted on a plurality of virtual lanes (VLs), said VLs associated with a defined VL priority and an allocated share of network bandwidth;

performing a comparison of said measured bandwidth to said allocated share of network bandwidth;

responsive to said comparison indicating that said measured bandwidth exceeds said allocated share of network bandwidth, adjusting said VL priority;

transmitting said packets based on said adjusted VL priority; and interleaving a first packet of said packets into a second packet of said packets if said second packet is depleted of flow control digits.

17. The non-transitory computer-readable storage medium of claim 16, wherein said adjusting comprises reducing said VL priority to a lowest value selected from a range of priorities.

18. The non-transitory computer-readable storage medium of claim 16, wherein said adjusting comprises disqualifying said VL from being transmitted.

19. At least one non-transitory computer-readable storage medium having instructions stored thereon which when executed by a processor result in operations for enhanced network communication, the operations comprising:
  measuring bandwidth consumed by packets transmitted on a plurality of virtual lanes (VLs), said VLs associated with a defined VL priority and an allocated share of network bandwidth;
  performing a comparison of said measured bandwidth to said allocated share of network bandwidth;
  responsive to said comparison indicating that said measured bandwidth exceeds said allocated share of network bandwidth, adjusting said VL priority;
  transmitting said packets based on said adjusted VL priority; and
  interrupting transmission of said packets from a first virtual lane to transmit packets from a second virtual lane, wherein said second virtual lane is associated with a specified latency sensitivity.

20. The non-transitory computer-readable storage medium of claim 19, wherein said priority of said interrupted packets from said first virtual lane is lower than said priority of said transmitted packets from said second virtual lane.

21. The non-transitory computer-readable storage medium of claim 19, wherein the operations further comprise re-starting transmission of a remaining fragment of said interrupted packet.

22. The non-transitory computer-readable storage medium of claim 19, wherein the operations further comprise receiving virtual lane configuration information from a network fabric manager of said network, said virtual lane configuration information comprising: said defined VL priority; said allocated share of network bandwidth; and said latency sensitivity.

* * * * *